United States Patent
Mueller et al.

[11] Patent Number: 5,916,443
[45] Date of Patent: Jun. 29, 1999

[54] FILTER APPARATUS FOR THE UNIFORM FILTERING OF PLASTIC MELTS

[75] Inventors: Harald Mueller, Taunusstein; Heinz-Werner Zimmermann, Brechen; Uwe Zimmermann, Hainau, all of Germany

[73] Assignee: Hoechst Diafoil GmbH, Germany

[21] Appl. No.: 08/851,192

[22] Filed: May 5, 1997

[30] Foreign Application Priority Data

May 6, 1996 [DE] Germany .......................... 196 18 090

[51] Int. Cl.[6] .............................. B01D 29/41; B01D 35/30
[52] U.S. Cl. ......................... 210/346; 210/347; 210/446; 210/456; 210/486; 425/197; 425/199
[58] Field of Search .................................. 210/346, 347, 210/232, 488, 486, 456, 446; 425/197, 199

[56] References Cited

U.S. PATENT DOCUMENTS

| | | |
|---|---|---|
| 2,661,845 | 12/1953 | Sullivan . |
| 3,480,706 | 11/1969 | Carpenter . |
| 3,817,377 | 6/1974 | Piggott . |
| 3,841,489 | 10/1974 | Combest . |
| 4,332,541 | 6/1982 | Anders . |
| 4,442,002 | 4/1984 | Morris . |
| 4,453,905 | 6/1984 | Bennett . |
| 4,568,459 | 2/1986 | Anders . |
| 4,572,784 | 2/1986 | Drori ...................................... 210/133 |
| 4,597,870 | 7/1986 | Lambertus . |
| 4,793,928 | 12/1988 | Tsukamoto . |
| 4,849,103 | 7/1989 | Schmidt et al. ..................... 210/323.2 |
| 4,904,384 | 2/1990 | Potz . |
| 4,964,984 | 10/1990 | Reeder . |
| 5,122,286 | 6/1992 | Kreyenborg et al. . |
| 5,271,838 | 12/1993 | Rahimi . |
| 5,449,458 | 9/1995 | Greuss . |
| 5,484,539 | 1/1996 | Tersi . |
| 5,601,854 | 2/1997 | Schroeder . |

FOREIGN PATENT DOCUMENTS

| | | |
|---|---|---|
| 0247 468 B1 | 5/1987 | European Pat. Off. . |
| 0658638 | 6/1995 | European Pat. Off. . |
| 915490 | 7/1954 | Germany . |
| 3430992 | 6/1985 | Germany . |
| 3419822 A1 | 11/1985 | Germany . |
| 3644489 | 8/1988 | Germany . |
| 3941831 | 10/1990 | Germany . |
| 4212928 | 10/1993 | Germany . |

OTHER PUBLICATIONS

Filtrieren von Kunststoffschmelzen pp. 129–148.

*Primary Examiner*—Thomas M. Lithgow
*Attorney, Agent, or Firm*—Gregory N. Clements

[57] ABSTRACT

In a filter apparatus 1, a central filter rod 6 is arranged in the interior 14 of a filter housing 2, the diameter d of which filter rod tapers in the direction of flow of the plastic melt. On the filter rod 6 are arranged filter discs 7 which are parallel to one another and have outer and inner diameters of equal size. The filter apparatus 1 operates as a continuous-flow filter apparatus in which the plastic melt flows in via an intake 4 and flows out via an outlet 5. A filter housing wall inner surface 3 tapers in the direction of flow of the plastic melt, so that a gap width $h_a(x)$ between a filter disc outer rim 8 and the filter housing wall inner surface 3 decreases in the direction of flow of the plastic melt.

30 Claims, 7 Drawing Sheets

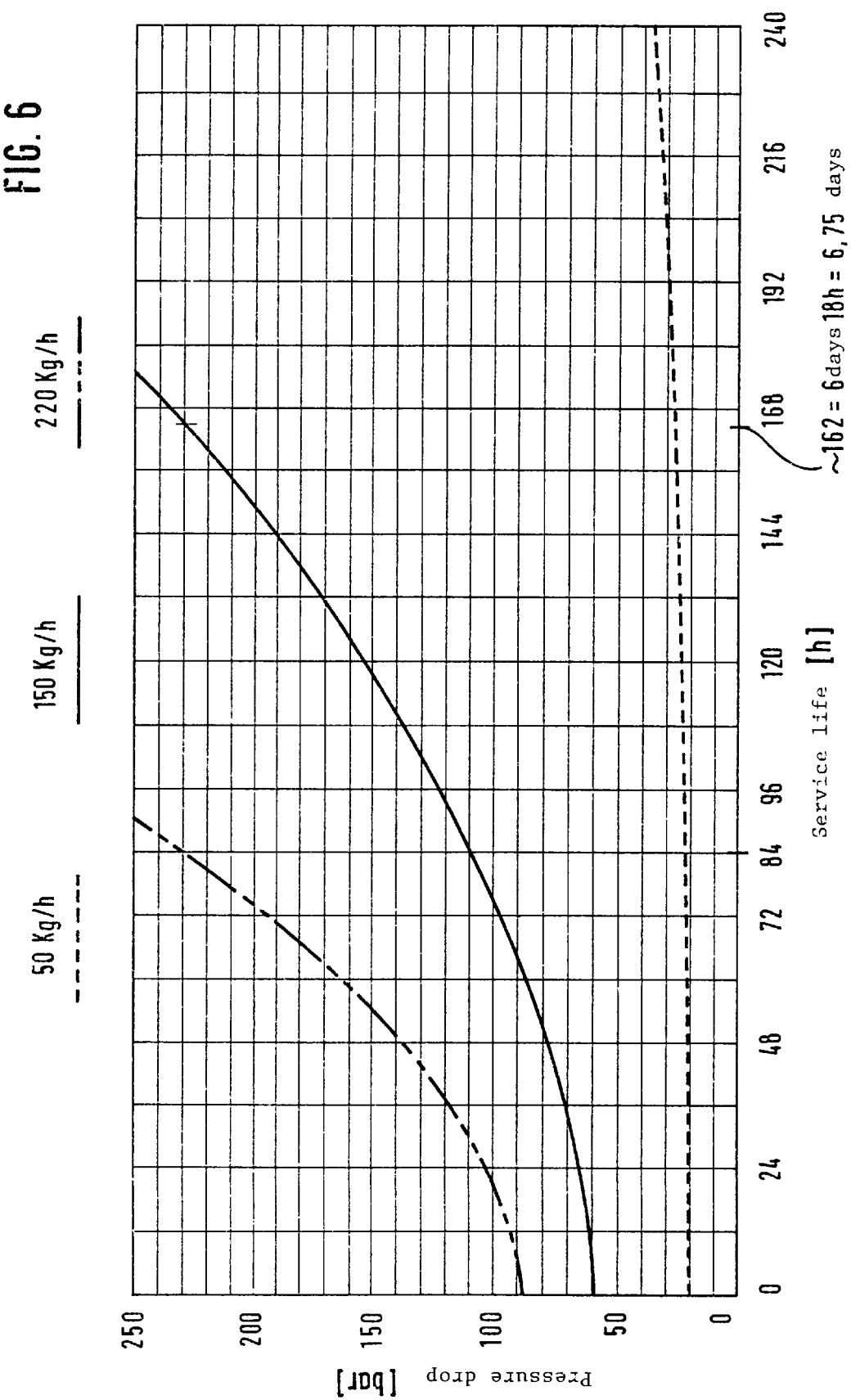

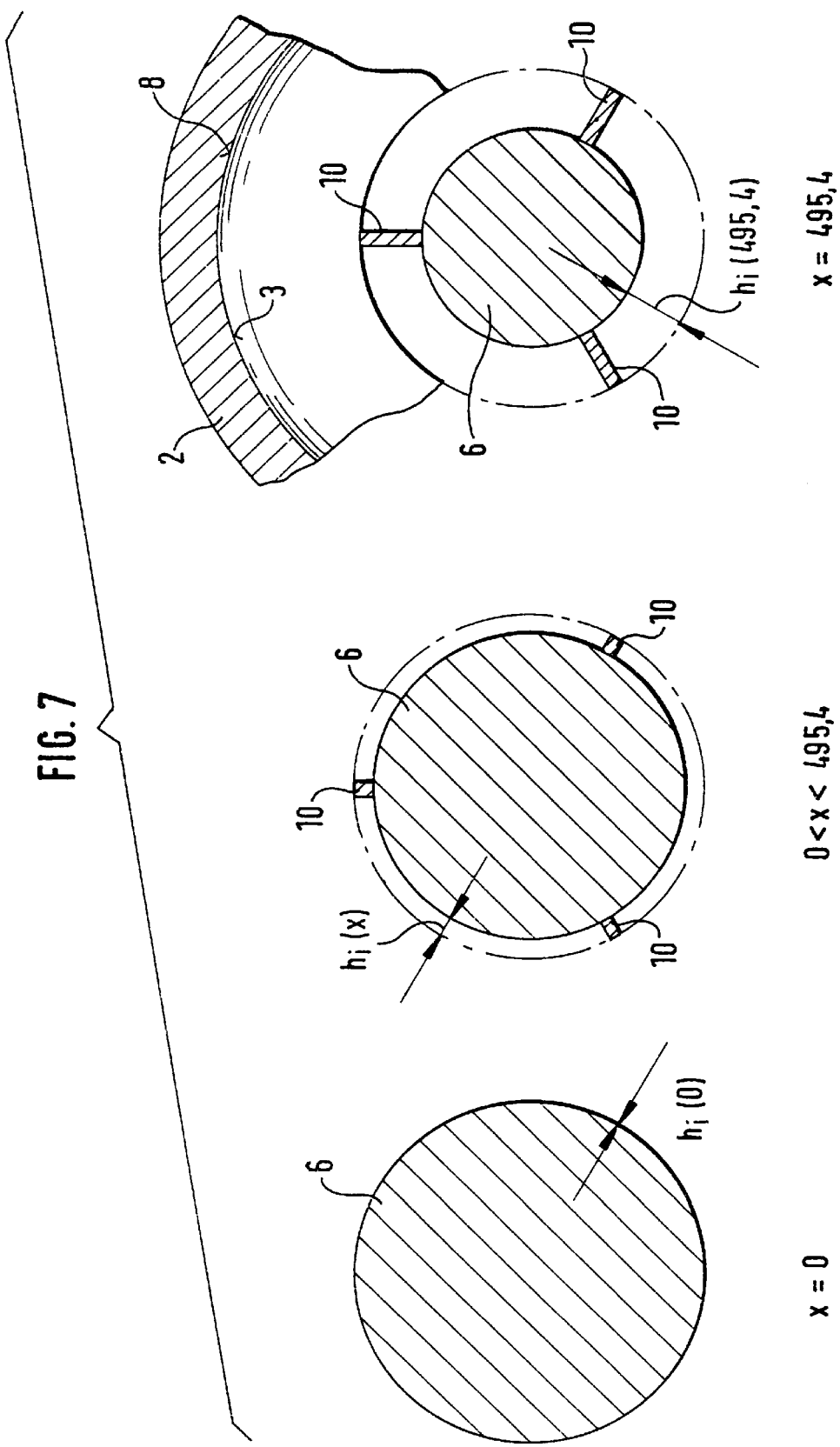

FILTER APPARATUS FOR THE UNIFORM FILTERING OF PLASTIC MELTS

BACKGROUND OF THE INVENTION

1. Field of the Invention

The invention relates to a filter apparatus for the uniform filtering of plastic melts having a filter housing in the interior of which filter discs are arranged in parallel to one another along a central filter rod, through which filter discs flow the plastic melt to be filtered.

2. Prior Art

Known filter apparatuses generally have a variety of geometries, for example a filter pot geometry in which a single filter surface in cylindrical form forms the inner wall of the filter pot, or consist of a filter candle arrangement in which a number of filter candles are accommodated in a filter housing, or consist of a cylindrical filter housing fitted with filter discs.

EP-B 0 247 468 discloses a filter apparatus for plastic melts in which candle filters are arranged in the filter housing along concentric circles, which candle filters consist of a support body and a filter material and through which flows the plastic melt to be filtered. Each candle filter in the support body contains a displacement body which forms a gap of constant width with the inner wall of the support body. The packing density of the candle filters per unit volume decreases from the periphery towards the center of the filter housing. To decrease the flow volume, flow bodies are arranged between the candle filters.

DE-A-34 19 822 describes a filter apparatus of a screw extruder for filtering the plastic melt exiting from the screw extruder, which filter apparatus possesses a filter housing having an inlet and outlet bore hole having a reversing slide valve which can be slid therein transversely to the melt stream. At least one recess, which comprises an annular turned groove, in the reversing slide valve serves to receive a screen body. For uniform distribution of the melt stream in the filter apparatus and of the pressure forces acting on the filter surface, the recess has an annular shape, and a melt channel connected to the inlet bore hole is present in which the cylindrical screen body encloses the turned groove of the recess in a form-fitting manner. A through-bore hole running in the longitudinal axis of the reversing slide valve connects the inlet bore hole to the outlet bore hole in the filter housing. A displacement cone is built into the through-bore hole, as a result of which an annular collection channel is formed which widens in the direction of flow of the melt towards the outlet bore hole.

This filter apparatus is a filter pot, which generally has a single filter surface in cylindrical shape which is arranged in the housing wall of the filter apparatus. In the known filter apparatus, a uniform distribution of the melt stream in the filter is sought and of the pressure forces acting on the filter surface, and complete relief of the transverse forces acting on the guide surface of the reversing slide valve is sought. By means of the displacement cone in the melt channel, the resistance to flow of the melt is intended to be reduced to a minimum in the reversing slide valve, with cross-sectional conditions which are favorable to the flow.

From the engineering aspect it is desirable, at the installed filter area, to have a filter apparatus having volume as small as possible which has no dead zones or only very small dead zones. The filter area generally forms in a filter pot the majority of the pot periphery or of the housing wall, the external shape of the filter pot being similar to that of a cylindrical candle filter. If there are no dead zones, or only very small dead zones, in the filter apparatus, the residence time distribution of the individual particles is narrow and the melt degradation is minimal. The residence time distribution describes the proportion of the mass particles of the plastic melt which has left the filter apparatus after a particular time.

A precondition for keeping dead times as small as possible is complete flooding of the filter volume by the melt. This is best achieved by the velocity vector not changing, or changing only very slightly, within the filter pot either in magnitude or in direction. A structural design of a filter apparatus in which, for example, the melt flow is diverted by 90 to 180°, should therefore be avoided if possible.

Compact filter apparatuses which comply with the above-mentioned requirements may, according to the prior art, as described, for example, in the literature references "Filtrieren von Kunststoffschmelzen" [Filtering of Plastic Melts] VDI-Verlag GmbH 1981, "Kunststoff 70", 1980 edition, Volume II, pages 753–758 and "Plastverarbeiter", Volume 33, 1982, No. 12, pages 1447–1454, best be implemented by the concentric arrangement of filter inserts in candle or disc form in filter housings.

In the case of filter apparatuses containing filter discs, in particular when they are arranged perpendicularly in the filter section, the apportioning of the part-streams and their throughputs over the individual filter discs, for example, are highly inhomogeneous. This leads to an elevated overall pressure drop and to a broadening of the residence time spectrum owing to the excessive residence times of the mass particles in the filter apparatus. Longer residence times and a broadening of the residence time spectrum cause a significant melt degradation, which is to be taken to mean that the mean molecular weight of the melt becomes lower owing to the longer action of elevated temperature on the melt.

The object of the invention is to improve a filter apparatus of the type described at the outset in such a manner that the throughput distribution of the melt over the individual filter discs is virtually constant, the residence time is made uniform and shortened, the residence time spectrum becomes constant and is kept narrow, the total pressure drop over the length of the filter apparatus is decreased and the melt degradation is kept very low.

SUMMARY OF THE INVENTION

This object is achieved according to the invention by a filter apparatus for the uniform filtering of plastic melts, having: a filter housing, in the interior of which filter discs are arranged in parallel to one another along a central filter rod, through which filter discs flow streams of the plastic melt to be filtered, in which a filter housing wall tapers in the direction of flow of the plastic melt and in which the diameter d of the filter rod decreases in the direction of flow of the plastic melt.

In a development of the invention, an internal diameter D of the interior of the filter housing tapers in the direction of flow of the plastic melt in accordance with a function greater than a square root function.

In this case, the filter discs expediently have outer and inner diameters $d_{ad}$ and $d_{id}$ of equal size.

In a further development of the invention, a gap width $h_a(x)$, corresponding to the distance from filter disc outer rim to filter housing wall inner surface, as a function of the positional coordinate x in the direction of flow of the plastic melt, is given by the relationship $$h_a(x) = h_{a\ min} + (h_{a\ max} - h_{a\ min})(1 - x/N)^\beta,$$

where $h_{a\ min}$ is the minimum gap width, $h_{a\ max}$ is the maximum gap width, N is the overall length of the filter region which includes all of the filter discs, and β is a geometric exponent which is greater than ¼ and less than ½. Preferably, the geometric exponent β=⅓.

Further development of the invention is given by the features of patent claims 6 to 16.

By means of the filter apparatus according to the invention, inter alia, low-viscosity plastic melts, for example of poly(ethylene terephthalate) (polyester), can be filtered with throughputs up to 5000 kg per hour, in particular 50 to 600 kg per hour, with low pressure drop, short residence times and at a very narrow residence time spectrum. Further advantages which result are a uniform filter disc covering and thus high service lives of the filter discs.

BRIEF DESCRIPTION OF THE DRAWINGS

The invention is described in more detail below with reference to the drawings. In the drawings:

FIG. 6 shows a diagram of the pressure drops and the service lives of a filter apparatus which contains a predetermined number of filter discs; and FIG. 7 shows cross sections of a filter rod at three points.

DESCRIPTION OF THE PREFERRED EMBODIMENTS

Figure 1:
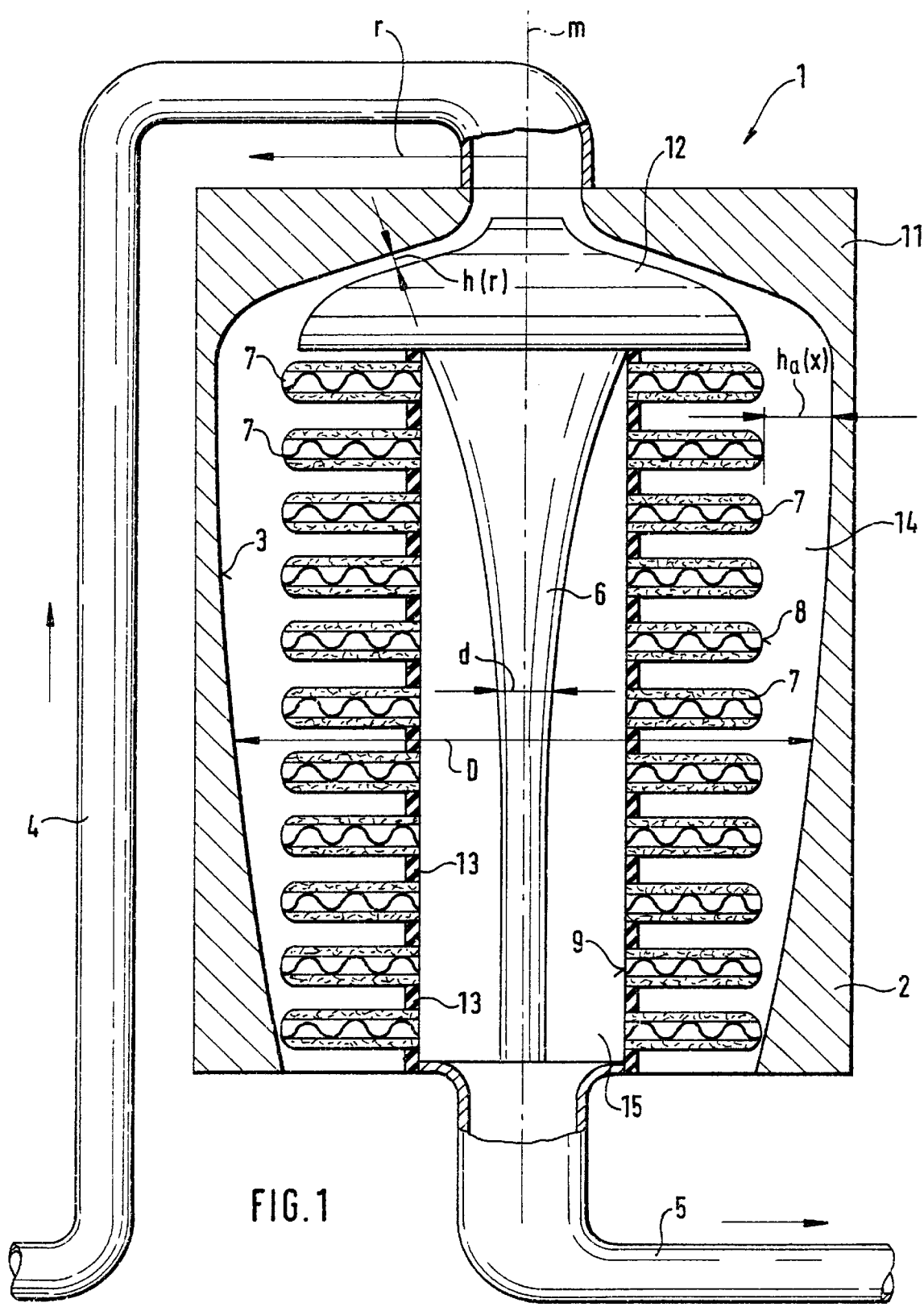
FIG. 1 shows a sectional view through a filter apparatus equipped with filter discs, which filter apparatus is arranged vertically in a filter section.

FIG. 1 shows, in section, a filter apparatus 1, whose filter housing 2 has, in its interior 14, filter discs 7 which are parallel to one another. The filter apparatus 1 is arranged vertically in the filter section, and a feed 4 for the plastic melt couples a screw extruder, which is not shown, to the filter housing 2 at the top. An outlet 5 is situated at the bottom of the filter housing 2. In the interior 14 a filter rod 6 is arranged centrally, on which filter rod are situated the filter discs 7 which are parallel to one another. The filter discs 7 have an outer diameter of 178 to 305 mm, i.e. from 7 to 12 inches, and have a disc thickness of the order of magnitude of 6 to 10 mm.

In the filter housing head 11, above the first filter disc 7, a baffle plate 12 is arranged, which forms a gap with a filter housing inner wall 3. The filter housing wall inner surface 3 encloses the interior 14 of the filter apparatus 1 which operates as a continuous flow filter apparatus. The plastic melt flowing through the feedline 4 into the filter apparatus 1 flows downwards through the gap between the baffle plate 12 and the filter housing wall inner surface 3 and divides into part-streams which flow through the individual filter discs 7. An inner diameter D of the filter housing 2 decreases in the direction of flow of the plastic melt in accordance with the tapering of the filter housing wall inner surface 3. As is described in more detail below, the inner diameter D changes in accordance with a function greater than a square root function.

The filter discs 7 have disc outer diameters of equal size and disc inner diameters of equal size. An outer rim 8 of the individual filter disc 7 is at a distance $h_a(x)$ from the filter housing wall inner surface 3 which changes with the positional coordinate x at the individual filter disc 7 (see FIG. 3 in this context). Between the filter discs 7 which are parallel to one another and have an inner rim 9 are situated seals 13. Part-streams flowing through the filter discs 7 enter into a channel 15 in which is situated the filter rod 6 and which is delimited by the seals 13 and the inner rims 9 of the filter discs 7. The plastic melt is filtered in the filter discs 7 so that only filtered plastic melt flows into the channel 15. A diameter d of the filter rod 6 decreases in the direction of flow of the plastic melt.

Figure 2:
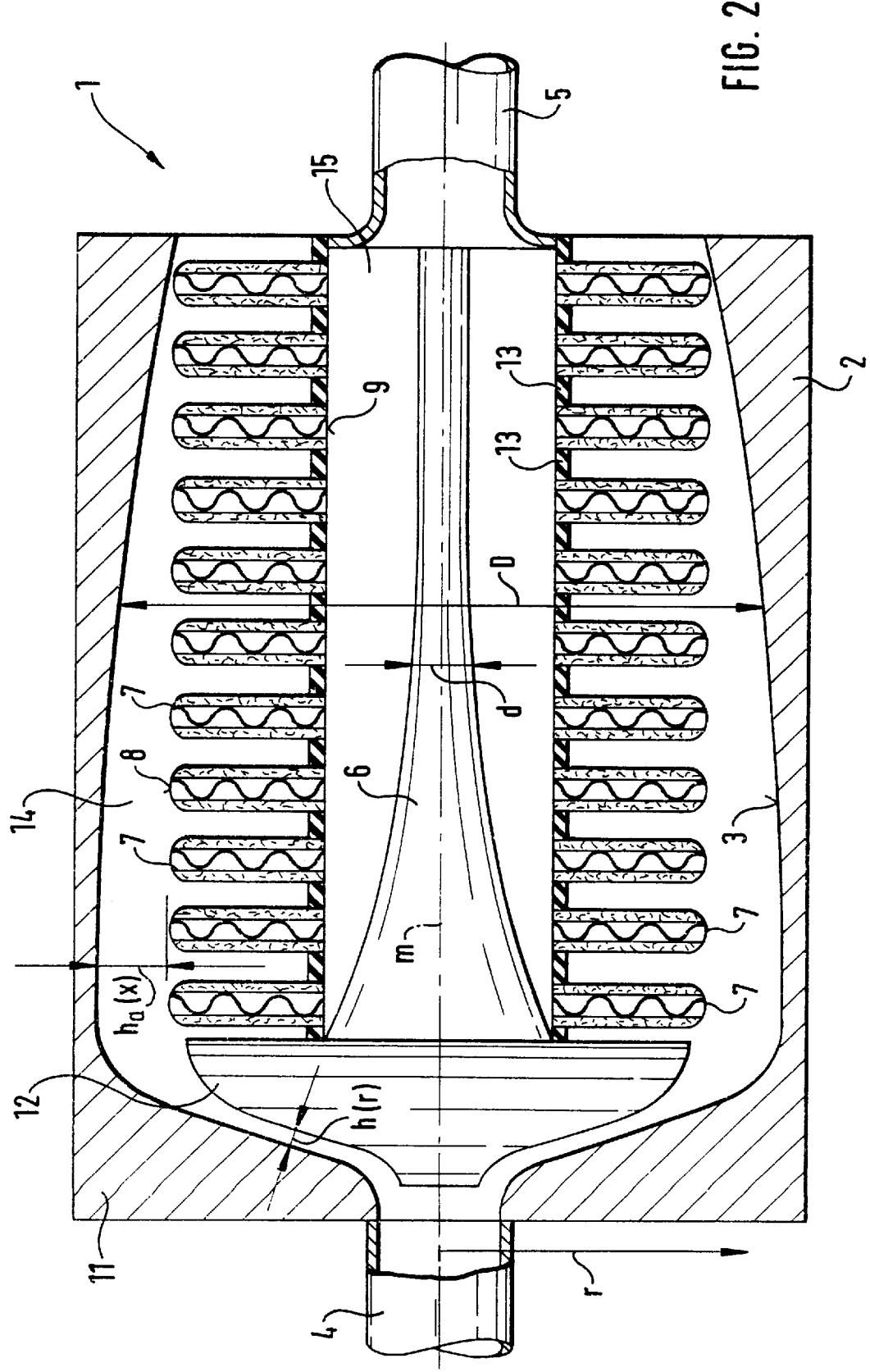
FIG. 2 shows, in section, the filter apparatus of FIG. 1, arranged horizontally in the filter section.

FIG. 2 shows the preferred arrangement of the filter apparatus 1, namely horizontal in the filter section, which gives even better results than the vertical arrangement according to FIG. 1 with respect to the flow profile and the uniform distribution of the part-streams of the plastic melt onto the individual filter discs 7. The filter apparatus 1 is operated as a continuous flow filter apparatus, the horizontal feedline 4 and the horizontal outlet 5 being mounted at the same height and centrally on the filter housing. The elements of the filter apparatus which are identical to the elements of the filter apparatus 1 according to FIG. 1 have the same reference numbers and are not described again.

The geometry of the filter apparatus 1 is described in more detail with reference to FIG. 3 which shows an enlarged detail of the filter apparatus 1 according to FIG. 1 or FIG. 2. The positional coordinate x represents the position of the individual filter disc 7 and runs in the direction of flow of the plastic melt, i.e. in FIG. 1 from top to bottom, and in FIG. 2 from left to right. A distance $a_f$ from the upperside of a filter disc 7 to the upperside of an adjacent filter disc 7 is in the order of magnitude of 6 to 13 mm, this distance also being equal to the sum of disc thickness and thickness of the seal 13. The disc thickness $S_d$ is 5 to 10 mm, while the thickness $d_{fm}$ of the filter medium of the individual filter disc ranges between 1 and 8 mm, in particular between 2.5 and 3 mm. The filter discs 7 have outer and inner diameters $d_{ad}$ and $d_{id}$ of equal size. The disc outer diameter is 178 to 305 mm, while the disc inner diameter is in the range from 38 to 85 mm.

Figure 3:
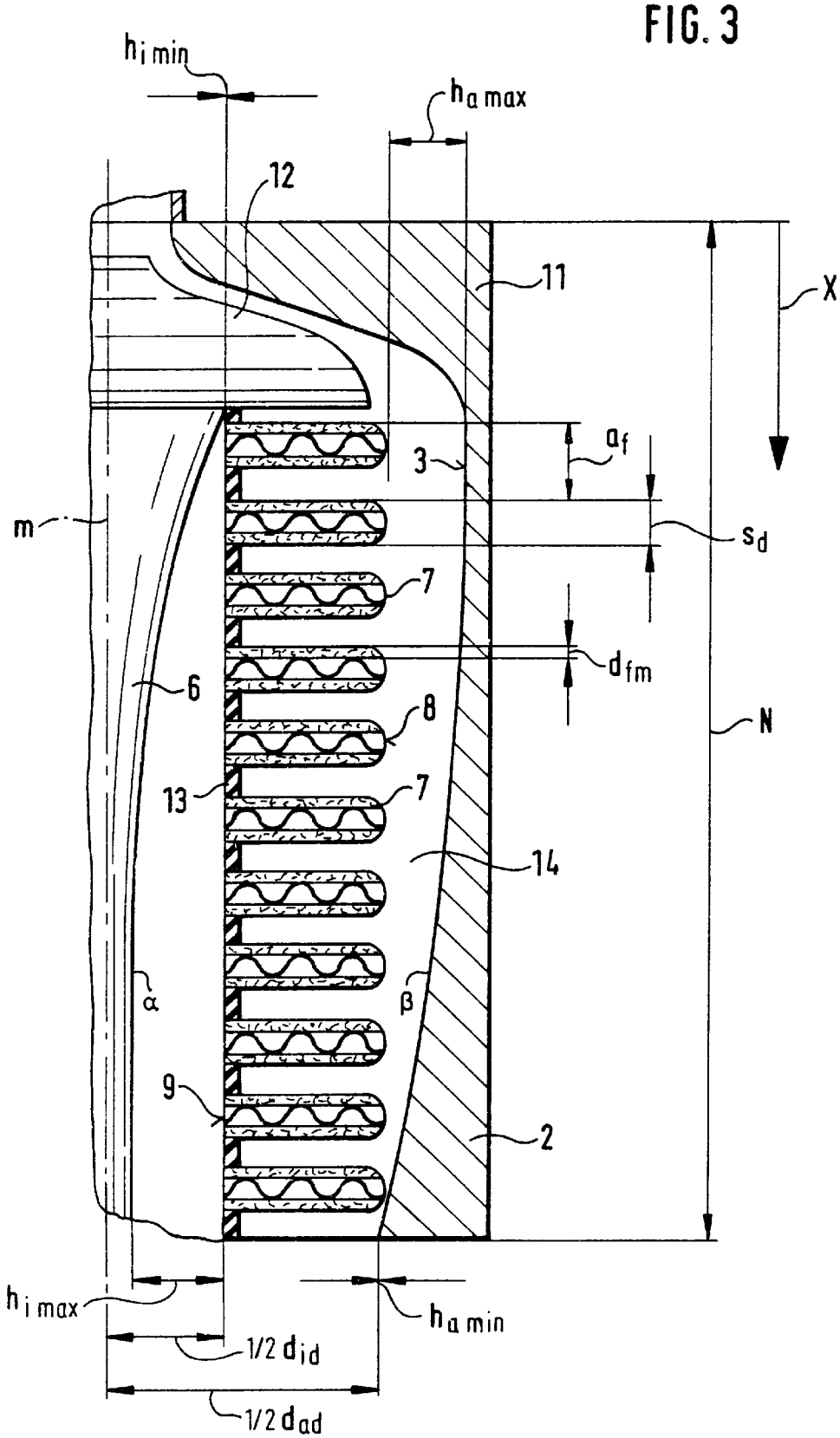
FIG. 3 shows an enlarged diagrammatic detail of the filter apparatus according to FIG. 1 for the definition of geometric parameters of the filter apparatus.

In each case, only half of the disc inner and outer diameters $½d_{id}$ and $½d_{ad}$ are shown in FIG. 3, from the center line m to the filter disc inner or outer rim. The minimum gap width $h_{a\ min}$ between filter disc rim and the filter housing wall inner surface 3 is located in the vicinity of the filter housing base, whereas the maximum gap width $h_{a\ max}$ is in the vicinity of a filter housing head. The relationships with respect to the distance between the filter rod 6 and the filter disc inner rim behave inversely. In this case the minimum gap width $h_i$ min is in the vicinity of the filter housing head, while the maximum gap width $h_{i\ max}$ is in the vicinity of the filter housing base. The exponents α and β of the root function determine the curvature of the filter rod 6 and of the filter housing wall inner surface 3.

Figure 4:
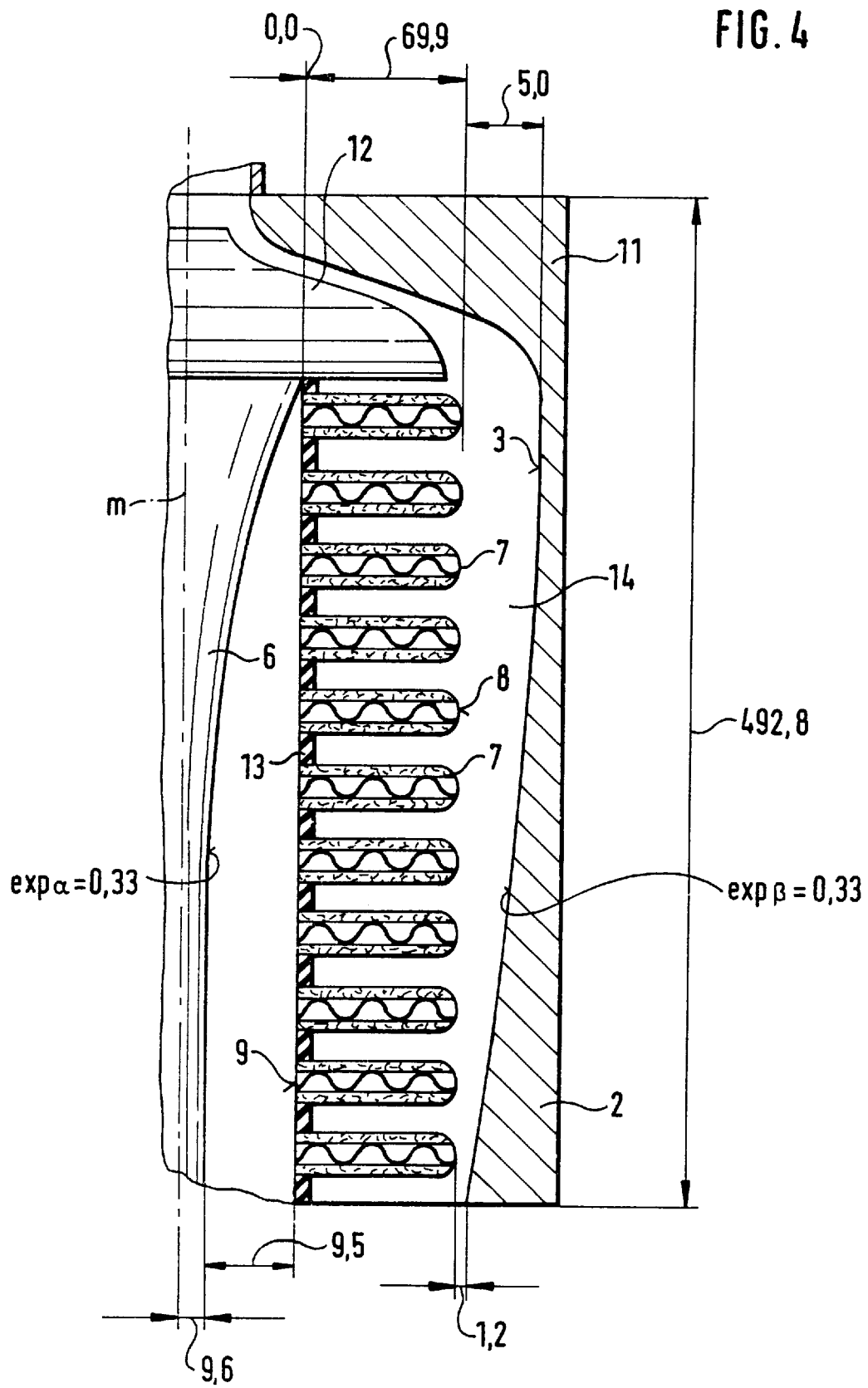
FIG. 4 shows the diagrammatic detail according to FIG. 3 with dimensional information on the geometric parameters of FIG. 3.

As FIG. 4 shows, the preferred value of α and β is in each case ⅓. For a total length N of the filter apparatus of 492.8 mm and 56 filter discs, $h_{a\ max}$=5.0 mm, $h_{a\ min}$=1.2 mm, $h_{i\ max}$9.5 mm, $h_{i\ min}$=0.0 mm, $½d_{id}$=19.1 mm and $½d_{ad}$=89 mm. The gap width $h_a(x)$ is the distance from the filter disc outer rim 8 to the filter housing wall inner surface 3, as a function of the positional coordinate in the direction of flow of the plastic melt. The gap width $h_a(x)$ is calculated according to the relationship $$h_a(x) = h_{a\,min} + (h_{a\,max} - h_{a\,min})\left(1 - \frac{x}{N}\right)^\beta$$

where $h_{a\,min}$ is the minimum gap width, $h_{a\,max}$ is the maximum gap width, N is the total length of the filter region which includes all of the filter discs 7, and β is the geometric exponent which is greater than ¼ and less than ½. The preferred value of the geometric exponent β is ⅓, as has already been mentioned above.

The housing inner diameter D, as a function of the height of the filter apparatus, is calculated from $$D(x) = d_{ad} + 2 \cdot h_a(x)$$

In other words, the inner diameter D of the interior 14 of the filter housing 2 as a function of the positional coordinate x in the direction of flow is given by the sum of the outer diameter $d_{ad}$ of the filter discs 7 and twice the distance $h_a(x)$ from the filter disc outer rim 8 to the filter housing wall inner surface 3 in accordance with FIGS. 1 and 2. The flow cross sections for the feed of the plastic melt between the filter disc rim 8 and the filter housing wall inner surface 3 are assumed to be planar gaps.

Figure 5:
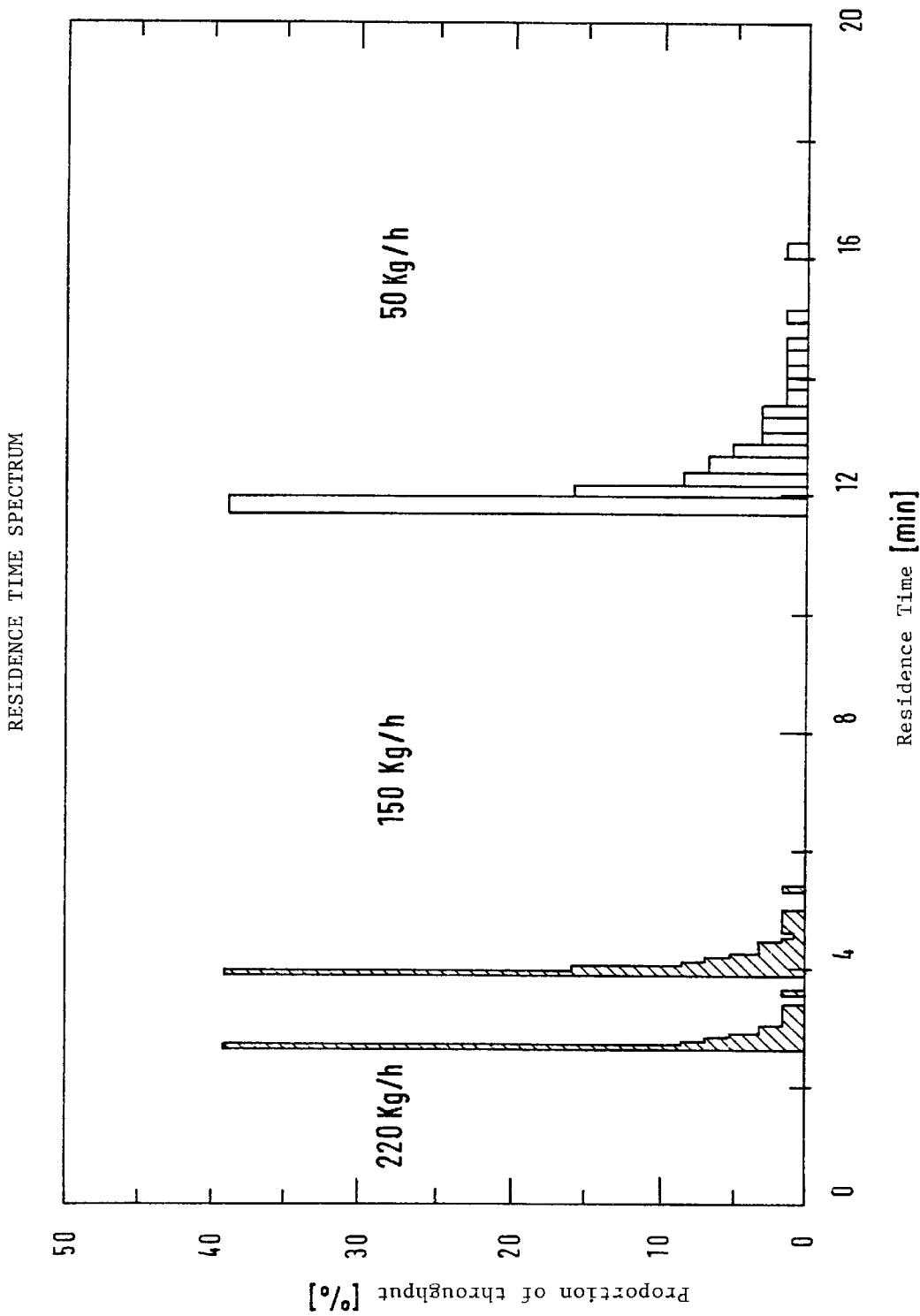
FIG. 5 shows residence time spectra for predetermined throughputs of plastic melts.

FIG. 5 shows the residence time spectra for differing flow rates of 50 kg/hour, 150 kg/hour and 220 kg/hour through a filter apparatus having the dimensions which have been described previously with reference to FIGS. 3 and 4. The percentage of the total flow rate per hour is plotted on the vertical axis, while the residence time in minutes is given on the horizontal axis. As can be seen in the diagram, the residence time decreases with increasing flow rate per hour, i.e. the residence time spectrum becomes narrower. The aim of the design of the filter apparatus according to the invention is a residence time distribution as narrow as possible, which may be achieved primarily by the following measures:

The filter housing interior or filter housing diameter which determines the annular flow cross section between the filter disc rim and the filter housing inner wall tapers in accordance with a root function in the direction of flow of the plastic melt, the exponent of the root function being in the range from 0 to 1, in particular from ¼ to ½, and preferably being equal to ⅓.

The diameter d of the filter rod 6 which determines the circular flow cross section between the filter rod and the filter discs likewise tapers in the direction of flow of the plastic melt in accordance with a root function whose exponent is in the range from 0 to 1, in particular from ¼ to ½. A preferred value of the exponent is ⅓.

In addition, the filter apparatus complies with the requirement for low pressure drop and low mean residence time, as has been shown above with reference to FIG. 5. The essential parameter for the low pressure drop and the low mean residence time is the filter area or the number of disc filters. A large filter area decreases the pressure drop, but increases the mean residence time.

The appropriate gap width $h_a(x)$ and $h_i(x)$ is chosen in such a manner that the most homogeneous throughput distribution possible is achieved over the individual filter discs and a narrow residence time spectrum of the melt flux is achieved. The gap width $h_i(x)$ as a function of the positional coordinate x in the direction of flow of the plastic melt represents the distance from rod exterior to filter disc inner rim 9 and is given by the relationship $$h_i(x) = h_{i\,max}(x/N)^\alpha$$

where $h_{i\,max}$ is the maximum gap width, x is the positional coordinate, N is the total length of the filter region which includes all of the filter discs 7, and α is the geometric exponent which is preferably in the range greater than ¼ and less than ½, as has already been mentioned above. In particular, the geometric exponent α is ⅓.

FIG. 6 shows filter pressure drop graphs for a filter apparatus 1 having 56 filter discs and the dimensions of FIG. 4 for the three known flow rates of 50 kg/hour, 100 kg/hour and 220 kg/hour. The total filter area of this filter apparatus is about 2.30 m². Assuming that the maximum permissible pressure drop is 230 bar, a service life of approximately 84 hours results for the filter apparatus at the high throughput of 220 kg/hour, and, at a mean throughput of 150 kg/hour, a service life of about 162 hours results. After these service lives, the filter apparatus must either be exchanged or the filter discs must be cleaned by backflushing in order to avoid pressure increase above the maximum permissible pressure drop.

FIG. 7 shows three rod cross sections over the total length N=495.4 mm of the filter apparatus 1. The rod cross section of the filter rod 6 shown on the left in FIG. 7 corresponds to the positional coordinate x=0, i.e. the rod cross section right at the top in FIG. 1 or on the left in FIG. 2 of the filter apparatus. The gap width $h_i$ corresponds to the minimum gap width $h_{i\,min}$ and is equal to 0. The mean rod cross section is less than the left rod cross section and corresponds to a positional coordinate 0<x<495.4 mm. The gap width $h_i(x)$ is greater than 0. The rod cross section on the right in FIG. 7 belongs to the positional coordinate x=495.4 mm. The gap width $h_i(x)$ corresponds to the maximum gap width $h_{i\,max}$ and is 9.5 mm. This rod cross section is the smallest and is situated at the outlet of the filter apparatus, i.e. in FIG. 1 at the bottom, or, in FIG. 2, at the right-hand end of the filter apparatus 1. The filter rod 6 has radial ridges 10 whose lengths increase in the direction of flow of the plastic melt, as can be seen from the mean and right-hand rod cross sections in FIG. 7. The ridges 10 serve as filter disc supports for the axial adjustment of the filter discs 7. The three ridges 10 are kept very narrow, in order to influence the flow cross sections in the channel of the filter apparatus 1 as little as possible. The individual flow cross sections in the channel 15 are treated or considered as planar gaps.

As may be seen in FIGS. 1 and 2, a baffle plate 12 is arranged above or upstream of the first filter disc 7 in the filter housing head 11. The feed from the rod inner part to the first filter disc is, in the case of the filter apparatus 1 according to the invention, optimized under the following aspects:

A constant pressure gradient prevails in the radial direction.

The baffle plate—housing distance is, at the rim, equal to the maximum gap width $h_a(x)$, i.e. the gap width between filter disc outer rim 8 and filter housing wall inner surface 3 for the positional coordinate x=0.

The gap width h(r) as a function of the radius r is then given by the relationship $$h(r) = \sqrt[3]{1.1125 \cdot 10^{-8} \cdot 1/r}$$

where h and r are in meters. The gap width h(r) and radius r are shown in FIG. 1. The gap width h(r) between filter housing wall inner surface and the baffle plate 12 is thus inversely proportional to the cube root of the radial distance r from the center line m of the filter rod 6 or of the filter apparatus 1. At a throughput of 50 kg/h of plastic melt, the residence time is 13 sec and the pressure drop is 0.3 bar in the gap between the baffle plate 12 and the filter housing head 11. At a throughput of 220 kg/h of plastic melt, the residence time is 5 sec and the pressure drop is 1.3 bar in the filter apparatus 1 when this contains 56 filter discs 7 having a disc outer diameter $d_{ad}$ of 178 mm.

The formulae or equations listed above for the gap widths $h_a(x)$, $h_i(x)$ and $h(r)$ are also valid for filter apparatuses 1 which have a total length N greater than or less than 494.5 mm, more or fewer filter discs than 56 and filter disc outer diameters greater than or less than 178 mm.

What is claimed is:

1. A filter apparatus (1) for the uniform filtering of plastic melts comprising a filter housing (2) having an inlet end and an outlet end and an interior (14) in which filter discs (7) are arranged in parallel to one another along a filter rod (6) centrally situated within a channel (15), said filter discs each having an outer rim (8) and an inner rim (9) and being individually positioned at a positional coordinate x, which is different for each disc in the direction of flow of the plastic melt, and being disposed for flow therethrough of streams of the plastic melt to be filtered therein and said channel being disposed for flow thereinto of filtered plastic melt and wherein the filter housing interior tapers along the entire length from the portion thereof where the filter disc nearest to said inlet end is situated to the portion thereof where the filter disc nearest to said outlet end is situated in the direction of flow of the plastic melt and the diameter d of the filter rod decreases along its entire length in the direction of flow of the plastic melt, and wherein said direction of flow of the plastic melt is from said inlet end to said outlet end.

2. The filter apparatus as claimed in claim 1, wherein the internal diameter D of the interior (14) of the filter housing (2) decrease in the direction of flow of the plastic melt in accordance with a function greater than a square root function.

3. The filter apparatus as claimed in claim 1 wherein the filter discs (7) have outer diameters $d_{ad}$ of equal size and inner diameters $d_{id}$ of equal size.

4. The filter apparatus as claimed in claim 1, wherein the filter housing interior is defined by the inner surface of a filter housing wall and wherein a gap width $h_a(x)$, corresponding to the distance from the filter disc outer rim (8) to the filter housing wall inner surface (3), as a function of the positional coordinate x of the individual filter disc in the direction of flow of the plastic melt, is given by the relationship $$h_a(x) = h_{a\ min} + (h_{a\ max} - h_{a\ min})(1 - x/N)^\beta,$$

where $h_{a\ min}$ is the minimum gap width, $h_{a\ max}$ is the maximum gap width, N is the overall length of the filter region which includes all of the filter discs (7), and $\beta$ is a geometric exponent which is greater than ¼ and less than ½.

5. The filter apparatus as claimed in claim 4, wherein the geometric exponent $\beta$ is equal to ⅓.

6. The filter apparatus as claimed in claim 1, wherein the diameter d of the filter rod (6) decreases in the direction of flow of the plastic melt in accordance with a function greater than a square root function.

7. The filter apparatus as claimed in claim 1, wherein the distance from rod exterior to filter disc inner rim (9), a gap width $h_i$, as a function of the positional coordinate x in the direction of flow of the plastic melt is given by the relationship $$h_i(x) = h_{i\ max}(x/N)^\alpha$$

where $h_{i\ max}$ is the maximum gap width, x is the positional coordinate, N is the total length of the filter region which includes all of the filter discs (7) and $\alpha$ is a geometric exponent which is greater than ¼ and less than ½.

8. The filter apparatus as claimed in claim 7, wherein the geometric exponent $\alpha$ is equal to ⅓.

9. The filter apparatus as claimed in claim 3, wherein the filter discs (7) have an outer diameter $d_{ad}$ in the range from 178 to 305 mm.

10. The filter apparatus as claimed in claim 1, wherein the inner diameter D of the interior (14) of the filter housing (2) as a function of the positional coordinate x in the direction of flow is given by the sum of the outer diameter $d_{ad}$ of the filter disc (7) and twice the distance $h_a(x)$ from the filter disc outer rim (8) to the filter housing inner wall (3).

11. The filter apparatus as claimed in claim 1, wherein the filter rod (6) is surrounded by radial ridges (10) whose lengths radially from said filter rod increase in the direction of flow of the plastic melt, and the ridges are provided as filter disc supports for axial adjustment of the filter discs (7).

12. The filter apparatus as claimed in claim 1, wherein said filter apparatus, as a continuous-flow filter apparatus, has a feed line (4) situated outside the filter housing (2).

13. The filter apparatus as claimed in claim 12, wherein said filter apparatus is mounted horizontally in a filter section.

14. The filter apparatus as claimed in claim 12, wherein said filter apparatus is arranged vertically in a filter section.

15. The filter apparatus as claimed in claim 1, wherein the filter housing comprises a filter housing head (11) and wherein a baffle plate (12) is arranged upstream of the filter disc (7) nearest to the inlet end in the filter housing head (11) and the gap width h(r) between filter housing wall inner surface (3) and baffle plate (12) is inversely proportional to the cube root of the radial distance r from the center line m of the filter rod (6).

16. The filter apparatus as claimed in claim 1, wherein seals (13) are arranged between the filter discs (7) which are parallel to one another, in the region of the inner diameter $d_{id}$ of the filter discs (7).

17. A filter apparatus comprising a housing having an inlet, an outlet, a wall and an interior cavity defined by the housing wall inner surface, a central filter rod positioned within said interior cavity, a plurality of filter discs arranged in parallel to one another in said interior cavity along and supported by said central filter rod, and a baffle plate arranged near the first disc upstream in the direction of flow of the plastic melt from said inlet to said outlet to form a gap with the wall inner surface, wherein said interior cavity tapers along the entire length in the direction of flow of the plastic melt from the portion thereof where the filter disc nearest to said inlet is situated to the portion thereof where the filter disc nearest to the outlet is situated, and the diameter of said filter rod decreases along its entire length in the direction of flow from said inlet to said outlet.

18. A filter apparatus according to claim 17 wherein the filter rod is centrally arranged within a channel and said interior cavity, each filter disc has an outer rim and an inner rim and there is a seal between each pair of filter discs and wherein said channel is delimited by the seals and the inner rims.

19. The filter apparatus as claimed in claim 18, wherein the filter discs have outer diameters $d_{ad}$ of equal size and inner diameters $d_{id}$ of equal size and wherein a gap width $h_a(x)$, corresponding to the distance from the filter disc outer rim (8) to the inner surface of the filter housing wall, as a function of the positional coordinate x of the individual filter disc in the direction of flow of the plastic melt, is given by the relationship $$h_a(x) = h_{a\ min} + (h_{a\ max} - h_{a\ min})(1 - x/N)^\beta,$$

where $h_{a\ min}$ is the minimum gap width, $h_{a\ max}$ is the maximum gap width, N is the overall length of the filter region which includes all of the filter discs, and $\beta$ is a geometric exponent which is greater than ¼ and less than ½ and wherein the diameter of the filter rod decreases along its entire length.

20. The filter apparatus as claimed in claim 17, wherein each filter disc has an outer rim and an inner rim and the filter discs have outer diameters $d_{ad}$ of equal size and inner diameters $d_{id}$ of equal size and wherein a gap width $h_a(x)$, corresponding to the distance from the filter disc outer rim to the inner surface of the filter housing wall, as a function of the positional coordinate x of the individual filter disc in the direction of flow of the plastic melt, is given by the relationship $$h_a(x) = h_{a\ min} + (h_{a\ max} - h_{a\ min})(1 - x/N)^\beta,$$

where $h_{a\ min}$ is the minimum gap width, $h_{a\ max}$ is the maximum gap width, N is the overall length of the filter region which includes all of the filter discs, and $\beta$ is a geometric exponent which is greater than ¼ and less than ½ and wherein the diameter of the filter rod decreases along its entire length.

21. A filter apparatus according to claim 17 wherein the filter rod has a solid cross section.

22. A filter apparatus according to claim 17 wherein the filter rod is surrounded by radial ridges whose lengths radially from said filter rod increase in the direction of flow of the plastic melt and which serve as filter disc supports for axial adjustment of the filter discs, said ridges being disposed so as to form individual flow cross sections in the channel.

23. A filter apparatus according to claim 17 wherein all of the discs are arranged along the central filter rod.

24. A filter apparatus according to claim 16 wherein each filter disc has an outer rim (8) and an inner rim (9) and wherein the channel (15) is delimited by the seals (13) and the inner rims.

25. A filter apparatus according to claim 2 wherein the filter discs (7) have outer diameters $d_{ad}$ of equal size and inner diameters $d_{id}$ of equal size.

26. A filter apparatus according to claim 14 wherein the feed line (4) couples a screw extruder to the housing (2) at the top and an outlet (5) is situated at the bottom of the filter housing and the direction of flow of the plastic melt is from top to bottom.

27. A filter apparatus according to claim 13 wherein a horizontal feedline (4) and a horizontal outlet (5) are mounted at the same height centrally on opposite ends of the filter housing (2) and the direction of flow of the plastic melt is from the feedline end to the outlet end.

28. A filter apparatus according to claim 1 wherein the filter rod (6) has a solid cross section.

29. A filter apparatus according to claim 1 wherein all of the discs (7) are arranged along the filter rod (6).

30. A filter apparatus (1) for the uniform filtering of plastic melts comprising a filter housing (2), an inlet end and an outlet end and an interior (14) in which discs (7) are arranged in parallel to one another along a central filter rod (6), which filter discs are disposed for flow therethrough of streams of the plastic melt to be filtered therein, wherein the filter housing interior tapers in the direction of the flow of the plastic melt and the diameter d of the filter rod decreases in the direction of the flow of the plastic melt and wherein the filter rod is surrounded by radial ridges (10) whose lengths radially from said filter rod increase in the direction of flow of the plastic melt, which ridges serve as filter disc supports for axial adjustment of the filter discs, said direction of flow of the plastic melt being from said inlet end to said outlet end.

\* \* \* \* \*

UNITED STATES PATENT AND TRADEMARK OFFICE
CERTIFICATE OF CORRECTION

PATENT NO. : 5,916,443

DATED : 6/29/99

INVENTOR(S) : MUELLER ET AL.

It is certified that error appears in the above-identified patent and that said Letters Patent is hereby corrected as shown below:

Column 3, line 3, delete "region which includes all of the filter discs" and insert --apparatus--

Column 5, line 7-8, delete "region which includes all of the filter discs 7" and insert --apparatus--

Column 6, line 2-3, delete "region which includes all of the filter discs 7" and insert --apparatus--

Column 7, line 51, delete "region which includes all of the filter discs (7)" and insert --apparatus--

Column 7-8, line 67-1, delete "region which includes all of the filter discs (7)" and insert --apparatus--

Column 9, line 4, delete "region which includes all of the filter discs" and insert --apparatus--

Column 9, line 21, delete "region which includes all of the filter discs" and insert --apparatus--

Signed and Sealed this

Second Day of November, 1999

Attest:

Q. TODD DICKINSON

*Attesting Officer*          *Acting Commissioner of Patents and Trademarks*